United States Patent
Bensberg et al.

(10) Patent No.: US 10,042,910 B2
(45) Date of Patent: Aug. 7, 2018

(54) DATABASE TABLE RE-PARTITIONING USING TWO ACTIVE PARTITION SPECIFICATIONS

(71) Applicants: Christian Bensberg, Heidelberg (DE); Lars Fricke, Karlsruhe (DE); Juchang Lee, Seoul (KR); Michael Muehle, Walldorf (DE); Thomas Peh, Heidelberg (DE); Wolfgang Stephan, Heidelberg (DE)

(72) Inventors: Christian Bensberg, Heidelberg (DE); Lars Fricke, Karlsruhe (DE); Juchang Lee, Seoul (KR); Michael Muehle, Walldorf (DE); Thomas Peh, Heidelberg (DE); Wolfgang Stephan, Heidelberg (DE)

(73) Assignee: SAP SE, Walldorf (DE)

( * ) Notice: Subject to any disclaimer, the term of this patent is extended or adjusted under 35 U.S.C. 154(b) by 446 days.

(21) Appl. No.: 14/188,541

(22) Filed: Feb. 24, 2014

(65) Prior Publication Data
US 2015/0242451 A1     Aug. 27, 2015

(51) Int. Cl.
*G06F 17/30* (2006.01)

(52) U.S. Cl.
CPC .. *G06F 17/30584* (2013.01); *G06F 17/30578* (2013.01)

(58) Field of Classification Search
CPC ............... G06F 17/30578; G06F 17/30584
USPC ........................................................ 707/615
See application file for complete search history.

(56) References Cited

U.S. PATENT DOCUMENTS

| | | | |
|---|---|---|---|
| 5,675,791 A | 10/1997 | Bhide et al. | |
| 5,960,194 A | 9/1999 | Choy et al. | |
| 6,449,625 B1* | 9/2002 | Wang | G06F 12/0246 |
| 6,665,684 B2 | 12/2003 | Zait et al. | |
| 6,691,166 B1 | 2/2004 | Gasior et al. | |
| 6,775,673 B2 | 8/2004 | Mahalingam et al. | |
| 6,820,095 B1 | 11/2004 | Yeung et al. | |
| 6,931,390 B1* | 8/2005 | Zait | G06F 17/30312 |
| 7,143,076 B2 | 11/2006 | Weinberg et al. | |
| 7,150,022 B2 | 12/2006 | Shutt et al. | |
| 7,240,054 B2* | 7/2007 | Adiba | G06F 17/30371 |
| 7,490,083 B2* | 2/2009 | Bourbonnais | G06F 17/30578 |
| 8,001,109 B2* | 8/2011 | Lohman | G06F 17/30445 |
| | | | 707/713 |
| 8,032,885 B2* | 10/2011 | Fish | G06F 17/30371 |
| | | | 718/101 |
| 8,515,898 B2* | 8/2013 | Bhide | G06F 17/30563 |
| | | | 707/602 |

(Continued)

*Primary Examiner* — Miranda Le
(74) *Attorney, Agent, or Firm* — Mintz Levin Cohn Ferris Glovsky and Popeo, P.C.

(57) ABSTRACT

Partitioning of source partitions of a table of a database to target partitions is initiated. Thereafter, a transition partition specification is specified that identifies the source partitions and the target partitions. Data is then moved (e.g., asynchronously moved, etc.) from the source partitions to the target partitions. Concurrently with the moving of the data, operates are handled using the transition partition specification. Subsequently, the source partitions are dropped when all of the data has been moved to the target partitions and there are no open transactions accessing the source partitions. Related apparatus, systems, techniques and articles are also described.

11 Claims, 4 Drawing Sheets

(56) References Cited

U.S. PATENT DOCUMENTS

| | | | |
|---|---|---|---|
| 8,515,945 B2* | 8/2013 | Pendap | G06F 17/30486 707/713 |
| 8,548,986 B2* | 10/2013 | Surna | G06F 17/30492 707/718 |
| 8,572,027 B2* | 10/2013 | Parees | G06F 17/30595 707/610 |
| 8,655,877 B2* | 2/2014 | Lariba-Pey | G06F 17/30498 707/736 |
| 8,676,772 B2 | 3/2014 | Gislason | |
| 8,738,565 B2* | 5/2014 | Cook | G06F 17/30412 707/602 |
| 8,799,284 B2* | 8/2014 | Jagtiani | G06F 17/30707 707/736 |
| 9,348,856 B2* | 5/2016 | Bhide | H04L 67/1097 |
| 9,384,237 B2* | 7/2016 | Peloski | G06F 17/5009 |
| 9,430,508 B2* | 8/2016 | Petculescu | G06F 17/30315 |
| 2007/0162506 A1* | 7/2007 | Grosman | G06F 17/30584 |
| 2009/0144346 A1* | 6/2009 | Duffy | G06F 17/30445 |
| 2009/0319581 A1* | 12/2009 | Seifert | G06F 17/30312 |
| 2010/0106934 A1 | 4/2010 | Calder et al. | |
| 2010/0161569 A1 | 6/2010 | Schreter | |
| 2011/0107021 A1* | 5/2011 | Muthukumarasamy | G06F 12/0207 711/104 |
| 2011/0295795 A1* | 12/2011 | Venkatasubramanian | G06F 17/30563 707/602 |
| 2011/0302151 A1* | 12/2011 | Abadi | G06F 17/30445 707/714 |
| 2013/0042087 A1 | 2/2013 | Shah et al. | |
| 2013/0166556 A1 | 6/2013 | Baeumges et al. | |
| 2013/0166589 A1 | 6/2013 | Baeumges et al. | |
| 2013/0346364 A1* | 12/2013 | Ahluwalia | G06F 17/30312 707/610 |
| 2015/0032758 A1* | 1/2015 | Schneider | G06F 17/30336 707/741 |
| 2015/0149513 A1* | 5/2015 | Beigel | G06F 17/30339 707/809 |

* cited by examiner

DATABASE TABLE RE-PARTITIONING USING TWO ACTIVE PARTITION SPECIFICATIONS

TECHNICAL FIELD

The subject matter described herein relates to database table re-partitioning that obviate the need for long-lasting exclusive locks on the table by concurrently using two active partition specifications.

BACKGROUND

A table within a database may be partitioned. If it is partitioned, rows are allocated to partitions based on a partition specification. Such a partition specification may for example be a string like "HASH 4 col1" where "HASH" identifies the used algorithm, "4" is the number of partitions and "col1" is the column of which the values are hashed to determining the target partition for a row.

When a table is created, it may directly be created as a partitioned table. It is also possible to split a non-partitioned table into a partitioned table. Partitioned tables may be re-partitioned again into a table with a different partition specification. In addition, the partitions of a table may be merged into a non-partitioned table. All of these transitions/operations can be referred to, unless otherwise specified, as "re-partitioning."

Re-partitioning means that in most cases all data has to be moved from one location (partition) to another. Such operations are comparable to copy and delete operations. In order to be compliant with backup & recovery concepts, it is also required to write redo log information which doubles the amount of data that has to written to disk.

Overall such operations are very costly from an I/O, main memory and CPU perspective. Moreover, the actual re-partitioning of a column requires that for writing, all required source pieces are available on a local server. For some cases, this can be optimized: For example a table "HASH 2 col1" has two partitions that may be located on two servers. If the table is to be re-partitioned to "HASH 4 col1", each of the servers can split the local partition locally as all required source data is present. This is different, if for example a table with "HASH 2 col1" is to be re-partitioned to "HASH 3 col1". All source partitions have to be moved to a common location where the re-partition operation can then take place. The resulting three partitions then have to be moved to respective target servers. Moving, in this regard, requires that there is a server in the landscape which is big enough to hold all data of the table as the resources (I/O, main memory and CPU) will only be utilized on that single server.

In addition to the high resource consumption and the need to move everything to a common location, there is one more aspect which is often the most critical one: While a table is re-partitioned, an exclusive lock is held on the table which prevents write operations. Only read operations are possible during re-partitioning.

Typically only the big tables are subject to re-partitioning. With such data tables, the data volume is high and hence re-partitioning can often require up to one hour or longer to finalize. During normal operation of the database while the table is in use, this prolonged amount time is not acceptable for both OLTP and OLAP processing. Therefore, given such time constraints, it is highly recommended to perform re-partitioning of huge tables only during a downtime.

SUMMARY

In one aspect, partitioning of source partitions of a table of a database to target partitions is initiated. Thereafter, a transition partition specification is specified that identifies the source partitions and the target partitions. Data is then moved (e.g., asynchronously moved, etc.) from the source partitions to the target partitions. Concurrently with the moving of the data, operations are handled using the transition partition specification. Subsequently, the source partitions are dropped when all of the data has been moved to the target partitions and there are no open transactions accessing the source partitions.

The table can be exclusively locked and the transition partition can be updated during such time to reflect the data as having been moved to the target partitions.

The data can be moved on a row level. For example, a data move transaction can be started as part of a background job. Data can then be selected from a source partition, and the selected data can be inserted into a target partition using an insert stack forming part of the database. The selected data can later be deleted from the source partition and the data move transaction can be committed.

In other variations, the data can be moved on a column level. In some cases, the data is moved on the column level using a remote agent. The database can be, for example, an in-memory column-oriented database such at that provided by the SAP HANA platform.

Non-transitory computer program products (i.e., physically embodied computer program products) are also described that store instructions, which when executed on one or more data processors of one or more computing systems, causes at least one data processor to perform operations herein. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including but not limited to a connection over a network (e.g. the Internet, a wireless wide area network, a local area network, a wide area network, a wired network, or the like), via a direct connection between one or more of the multiple computing systems, etc.

The subject matter described herein provides many advantages. For example, the current subject matter provides more rapid and efficient database table re-partitioning techniques.

The details of one or more variations of the subject matter described herein are set forth in the accompanying drawings and the description below. Other features and advantages of the subject matter described herein will be apparent from the description and drawings, and from the claims.

DESCRIPTION OF DRAWINGS

Like reference symbols in the various drawings indicate like elements.

DETAILED DESCRIPTION

Figure 1:
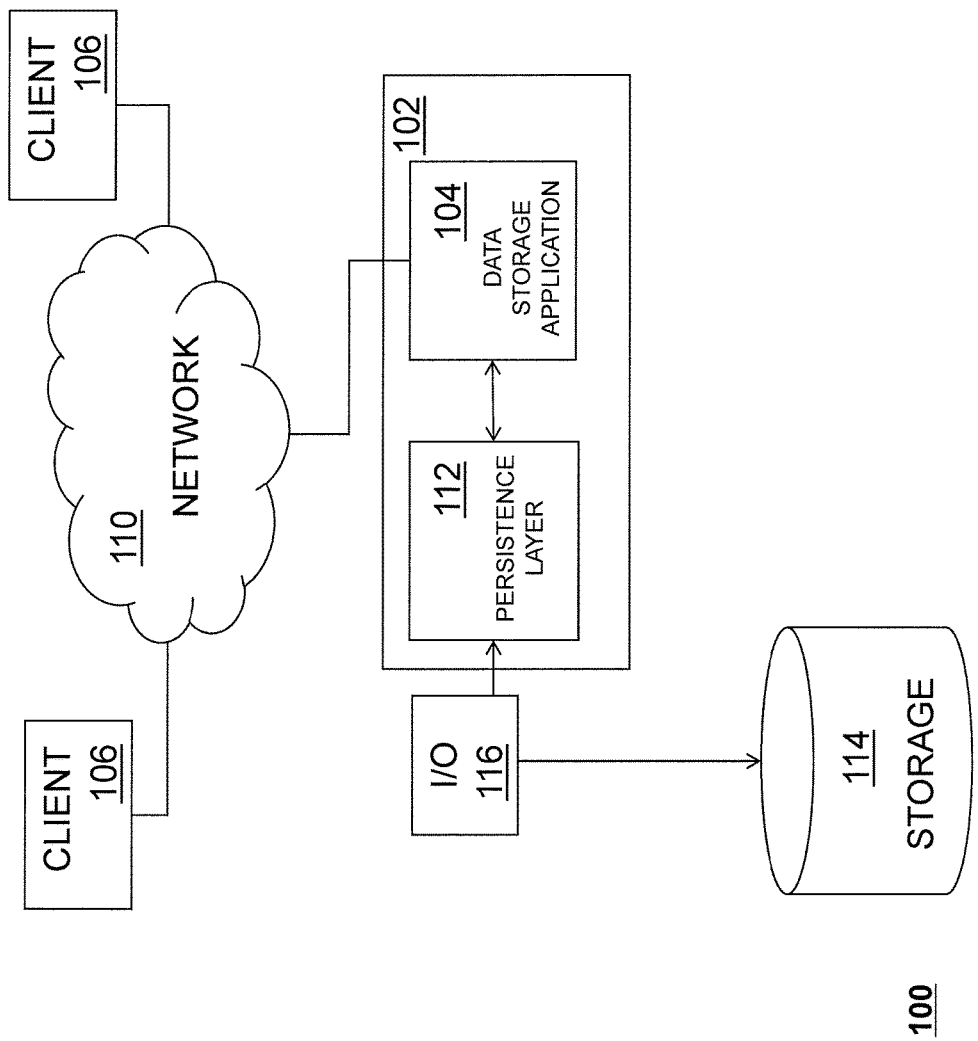
FIG. 1 is a diagram illustrating a system including a data storage application.
Figure 2:
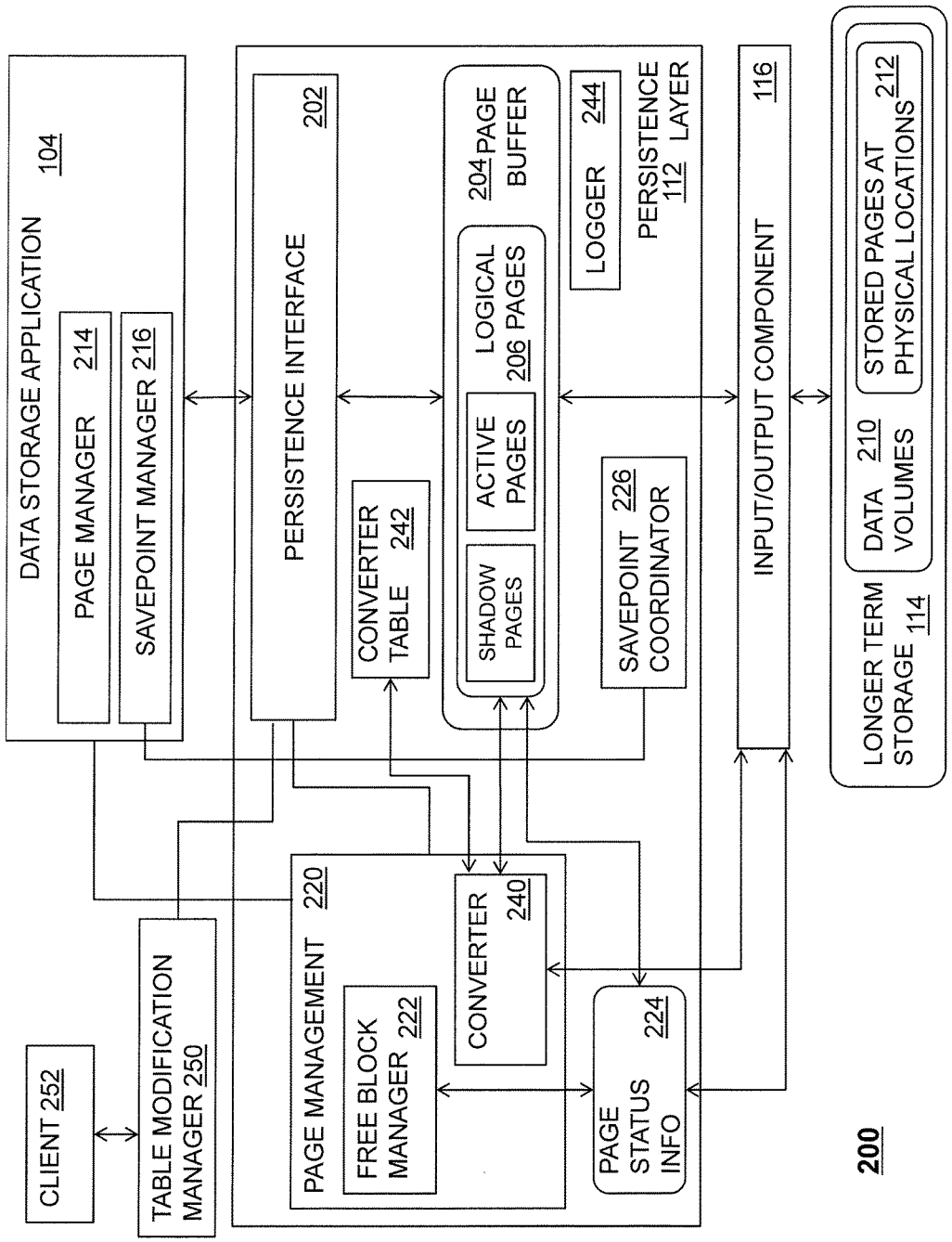
FIG. 2 is a diagram illustrating details of the system of FIG. 1.

FIGS. 1 and 2 are diagrams providing an example environment for implementing the subject matter described herein. It will be appreciated that other environments can be utilized including variations of the environments illustrated in FIGS. 1 and 2. In particular, FIG. 1 shows an example of a system 100 in which a computing system 102, which can include one or more programmable processors that can be collocated, linked over one or more networks, etc., executes one or more modules, software components, or the like of a data storage application 104. The data storage application 104 can include one or more of a database, an enterprise resource program, a distributed storage system (e.g. NetApp Filer available from NetApp of Sunnyvale, Calif.), or the like.

The one or more modules, software components, or the like can be accessible to local users of the computing system 102 as well as to remote users accessing the computing system 102 from one or more client machines 106 over a network connection 110. One or more user interface screens produced by the one or more first modules can be displayed to a user, either via a local display or via a display associated with one of the client machines 106. Data units of the data storage application 104 can be transiently stored in a persistence layer 112 (e.g. a page buffer or other type of temporary persistency layer), which can write the data, in the form of storage pages, to one or more storages 114, for example via an input/output component 116. The one or more storages 114 can include one or more physical storage media or devices (e.g. hard disk drives, persistent flash memory, random access memory, optical media, magnetic media, and the like) configured for writing data for longer term storage. It should be noted that the storage 114 and the input/output component 116 can be included in the computing system 102 despite their being shown as external to the computing system 102 in FIG. 1.

Data retained at the longer term storage 114 can be organized in pages, each of which has allocated to it a defined amount of storage space. In some implementations, the amount of storage space allocated to each page can be constant and fixed. However, other implementations in which the amount of storage space allocated to each page can vary are also within the scope of the current subject matter.

FIG. 2 shows a software architecture 200 consistent with one or more features of the current subject matter. A data storage application 104, which can be implemented in one or more of hardware and software, can include one or more of a database application, a network-attached storage system, or the like. According to at least some implementations of the current subject matter, such a data storage application 104 can include or otherwise interface with a persistence layer 112 or other type of memory buffer, for example via a persistence interface 202. A page buffer 204 within the persistence layer 112 can store one or more logical pages 206, and optionally can include shadow pages, active pages, and the like. The logical pages 206 retained in the persistence layer 112 can be written to a storage (e.g. a longer term storage, etc.) 114 via an input/output component 116, which can be a software module, a sub-system implemented in one or more of software and hardware, or the like. The storage 114 can include one or more data volumes 210 where stored pages 212 are allocated at physical memory blocks.

In some implementations, the data storage application 104 can include or be otherwise in communication with a page manager 214 and/or a savepoint manager 216. The page manager 214 can communicate with a page management module 220 at the persistence layer 112 that can include a free block manager 222 that monitors page status information 224, for example the status of physical pages within the storage 114 and logical pages in the persistence layer 112 (and optionally in the page buffer 204). The savepoint manager 216 can communicate with a savepoint coordinator 226 at the persistence layer 204 to handle savepoints, which are used to create a consistent persistent state of the database for restart after a possible crash.

In some implementations of a data storage application 104, the page management module of the persistence layer 112 can implement a shadow paging. The free block manager 222 within the page management module 220 can maintain the status of physical pages. The page buffer 204 can included a fixed page status buffer that operates as discussed herein. A converter component 240, which can be part of or in communication with the page management module 220, can be responsible for mapping between logical and physical pages written to the storage 114. The converter 240 can maintain the current mapping of logical pages to the corresponding physical pages in a converter table 242. The converter 240 can maintain a current mapping of logical pages 206 to the corresponding physical pages in one or more converter tables 242. When a logical page 206 is read from storage 114, the storage page to be loaded can be looked up from the one or more converter tables 242 using the converter 240. When a logical page is written to storage 114 the first time after a savepoint, a new free physical page is assigned to the logical page. The free block manager 222 marks the new physical page as "used" and the new mapping is stored in the one or more converter tables 242.

The persistence layer 112 can ensure that changes made in the data storage application 104 are durable and that the data storage application 104 can be restored to a most recent committed state after a restart. Writing data to the storage 114 need not be synchronized with the end of the writing transaction. As such, uncommitted changes can be written to disk and committed changes may not yet be written to disk when a writing transaction is finished. After a system crash, changes made by transactions that were not finished can be rolled back. Changes occurring by already committed transactions should not be lost in this process. A logger component 344 can also be included to store the changes made to the data of the data storage application in a linear log. The logger component 244 can be used during recovery to replay operations since a last savepoint to ensure that all operations are applied to the data and that transactions with a logged "commit" record are committed before rolling back still-open transactions at the end of a recovery process.

With some data storage applications, writing data to a disk is not necessarily synchronized with the end of the writing transaction. Situations can occur in which uncommitted changes are written to disk and while, at the same time, committed changes are not yet written to disk when the writing transaction is finished. After a system crash, changes made by transactions that were not finished must be rolled back and changes by committed transaction must not be lost.

To ensure that committed changes are not lost, redo log information can be written by the logger component 244 whenever a change is made. This information can be written to disk at latest when the transaction ends. The log entries can be persisted in separate log volumes while normal data is written to data volumes. With a redo log, committed changes can be restored even if the corresponding data pages were not written to disk. For undoing uncommitted changes, the persistence layer 112 can use a combination of undo log entries (from one or more logs) and shadow paging.

The persistence interface 202 can handle read and write requests of stores (e.g., in-memory stores, etc.). The persistence interface 202 can also provide write methods for writing data both with logging and without logging. If the logged write operations are used, the persistence interface 202 invokes the logger 244. In addition, the logger 244 provides an interface that allows stores (e.g., in-memory stores, etc.) to directly add log entries into a log queue. The logger interface also provides methods to request that log entries in the in-memory log queue are flushed to disk.

Log entries contain a log sequence number, the type of the log entry and the identifier of the transaction. Depending on the operation type additional information is logged by the logger 244. For an entry of type "update", for example, this would be the identification of the affected record and the after image of the modified data.

When the data application 104 is restarted, the log entries need to be processed. To speed up this process the redo log is not always processed from the beginning. Instead, as stated above, savepoints can be periodically performed that write all changes to disk that were made (e.g., in memory, etc.) since the last savepoint. When starting up the system, only the logs created after the last savepoint need to be processed. After the next backup operation the old log entries before the savepoint position can be removed.

When the logger 244 is invoked for writing log entries, it does not immediately write to disk. Instead it can put the log entries into a log queue in memory. The entries in the log queue can be written to disk at the latest when the corresponding transaction is finished (committed or aborted). To guarantee that the committed changes are not lost, the commit operation is not successfully finished before the corresponding log entries are flushed to disk. Writing log queue entries to disk can also be triggered by other events, for example when log queue pages are full or when a savepoint is performed.

With the current subject matter, the logger 244 can write a database log (or simply referred to herein as a "log") sequentially into a memory buffer in natural order (e.g., sequential order, etc.). If several physical hard disks/storage devices are used to store log data, several log partitions can be defined. Thereafter, the logger 244 (which as stated above acts to generate and organize log data) can load-balance writing to log buffers over all available log partitions. In some cases, the load-balancing is according to a round-robin distributions scheme in which various writing operations are directed to log buffers in a sequential and continuous manner. With this arrangement, log buffers written to a single log segment of a particular partition of a multi-partition log are not consecutive. However, the log buffers can be reordered from log segments of all partitions during recovery to the proper order.

As stated above, the data storage application 104 can use shadow paging so that the savepoint manager 216 can write a transactionally-consistent savepoint. With such an arrangement, a data backup comprises a copy of all data pages contained in a particular savepoint, which was done as the first step of the data backup process. The current subject matter can be also applied to other types of data page storage.

The data storage application 104 can utilize multi-version concurrent control (MVCC) for transaction isolation and consistent reading. Each row of the database can be associated with a unique, monotonically-increasing identifier (RowID). When a new version of the record is created, this new version can also become a new RowID (i.e., due to MVCC semantics, old versions must be kept for parallel readers and will be cleaned only during garbage collection after commit).

References herein to pages can refer to pages of a table stored in memory of an in-memory database forming part of the data storage application 104. With the MVCC-based database table implementation, all internal transient data objects of a table can be versioned. These data objects can include table a header object, metadata object(s), other internal state(s) such as vector of loaded pages, dictionary hashes/trees for compressed columnar tables, and the like. In addition, all table control structures used by readers can be versioned. These structures include, for example, page lists, value indirection vectors, internal metadata, and more. Readers do not acquire any locks on data structure, but rather, work with a current version of a data structure until query or query'plan operator ends. With this arrangement, old versions only remain for a short period of time (e.g., sub-seconds). As versioned objects are typically small, memory overhead is also small. In addition, even with OLTP systems, incompatible changes are rare (i.e., there are not many concurrent versions, etc.). Moreover, with some implementations, if older versions of prioritized/big objects (e.g., main part of a columnar table, etc.) still exist, no new version of the corresponding object can be created. For example, if there is a reader doing a scan on the main part of a columnar table, which started during columnar table merge from version n−1 to version n, this scan uses main part in version n−1. Even after merge to version n is finished, further merge from version n to version n+1 will be prevented as long as there are any scans running on main part in version n−1 (as this might increase memory demand prohibitively).

The current subject matter can utilize what is referred to herein as a transition partition specification. If a database table (sometimes referred to herein simply as a "table") either has partition specification A or B—the re-partitioning operation is atomic. At the beginning of the operation, the operation can internally create new target partitions, data can be moved and in the end the old partitions are dropped. But from an outside perspective, it is either A or B. With the current subject matter, two or more partition specifications can be active at the same time—these two partitions form a union in a transition specification.

Figure 3:
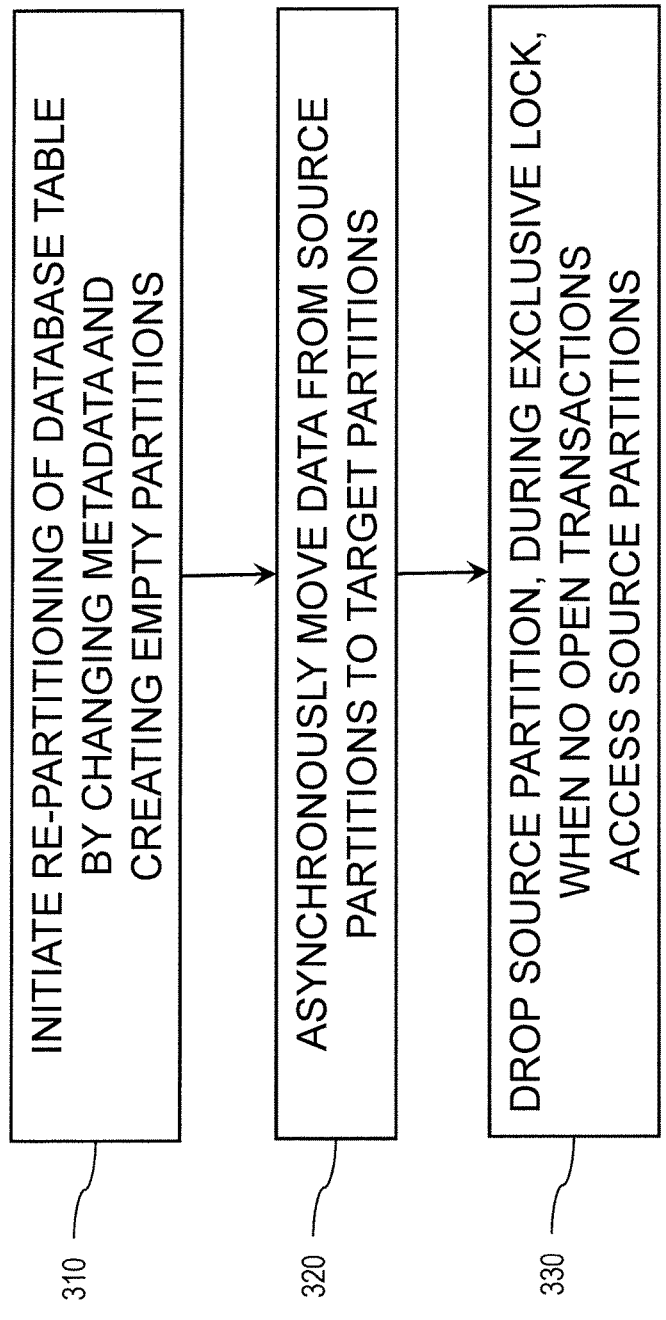
FIG. 3 is a process flow diagram illustrating asynchronous database table partitioning.

As an example, a transition partition specification can be as follows "HASH 2 col1→HASH 4 col1". With reference to diagram 300 of FIG. 3, at 310, a database administrator can start a re-partitioning from "HASH 2 col1" to "HASH 2 col1→HASH 4 col1". During this step only the metadata would be changed and four new empty partitions would be created. This will be very fast and hence require an exclusive lock which is only kept for a few seconds. Thereafter, at 320, the database can internally and asynchronously move data from the old partitions (sometimes referred to as source partitions) into the new partitions (sometimes referred to as target partitions). During this step, for example, SELECT operations can consider the source and the target partitions. When all data has been moved and if there are no more open transactions that may possibly access the source partitions, at 330, the source partitions can eventually be dropped and the partition specification can be changed from "HASH 2 col1→HASH 4 col1" to "HASH 4 col1". This step again requires an exclusive lock, but only for a few seconds.

To have a transition partition specification is independent from how the data is actually moved. While there are different ways for data to be moved, the current subject matter is directed to movement on a row-level via the insert stack.

When a database client inserts a single row or bulk data into a table, a table modification manager 250 (which can be coupled to one or more clients 252) can issue an INSERT statement which is processed in an insert stack of the database. That stack ensures (in certain environments such as those illustrated in FIGS. 1-2) that the data is logged (to prevent data loss in case of crashes, to ensure recoverability etc.), the new data is written to the delta index, the new rows are referenced in the component which assures that all transactions see the correct data (i.e., multi-version concurrency control/MVCC, etc.).

A component can be provided that acts as a background job in the database that does the following for chunks of data:

1. Start a new transaction;
2. Select data from a source partition;
3. Insert that data into a target partition (via the insert stack);
4. Delete the data from the source partition; and
5. Commit the transaction.

This transaction, as used herein, is referred to as a data move transaction.

That background job can be active in times at which the system has a sufficient amount of resources available. While this background job runs, many rows can be inserted into the delta index of the target partitions. Delta merges on these partitions may be necessary in order to keep the memory footprint at a reasonable level.

The following addresses read and write operations while data is being asynchronously moved. From the perspective of other transactions that are started by any other database client: such a transaction was either started before or after the move transaction committed. Hence, the transaction has a transactional view which either sees the data in the source partitions or in the target partitions. As the data is the same, it has no effect on other transactions whether they read data from the source or the target partitions.

However, such an arrangement becomes more complex for write operations. The move operation is just like any other transaction—and transactions may be in conflict with one another. If this happens, one of the transactions reports an error when it tries to commit changes which can result in this transaction being rolled back. This is called "serialization error". If a background job, such as re-partitioning, constantly causes other transactions to fail, these failures, in turn, leads to errors in applications running on top of the database and/or is problematic for human users. Whether the re-partitioning may cause other transactions to fail is highly dependent on the isolation level. With some environments, a default transaction isolation level can be "Read Committed". With "Read Committed" other client transactions are not affected by the re-partitioning. Therefore serialization issues, are typically not a problem in this case. In addition, it can be possible that when using "Read Committed" problems like "phantom reads" occur because the data may be changed by other transactions. As the re-partitioning operations only move data without changing any values, such problems also cannot occur. If, on the other hand, if the isolation levels "Repeatable Read" or "Serializable" are utilized, serialization issues for the application transactions or the move transaction become likely.

Below are options to reduce the likelihood that client transactions fail due to serialization issues. First, transaction handling can be provided in a way that it is more likely that it is the move transactions which fail and not the client transactions. That being said, there are situations in which the client transaction must fail. As an example, move transaction M is currently moving some rows. Now another transaction A starts. Transaction M commits. Transaction A now writes data in exactly these rows that have just been moved. In this situation there is no other chance than to rollback transaction A. Second, another way to reduce the likelihood of serialization issues is to reduce the chunk size. The fewer rows that are touched in the move transaction, the lower the likelihood that another transaction touches the same rows.

Below are two options for an update operation for a row in a source partition. With a first option, the row can be updated in the source partition. If some rows are frequently updated, the move operation may have many serialization issues. A squeeze-out phase can, in some cases, be required in which client transactions are prohibited and the move operation may eventually move the rows from the source to the target partitions. With a second option, the row is read from the source partition and the updated row is written into the target partitions. Thereafter, the row is deleted in the source partition. This way the situation described above will not occur.

Figure 4:
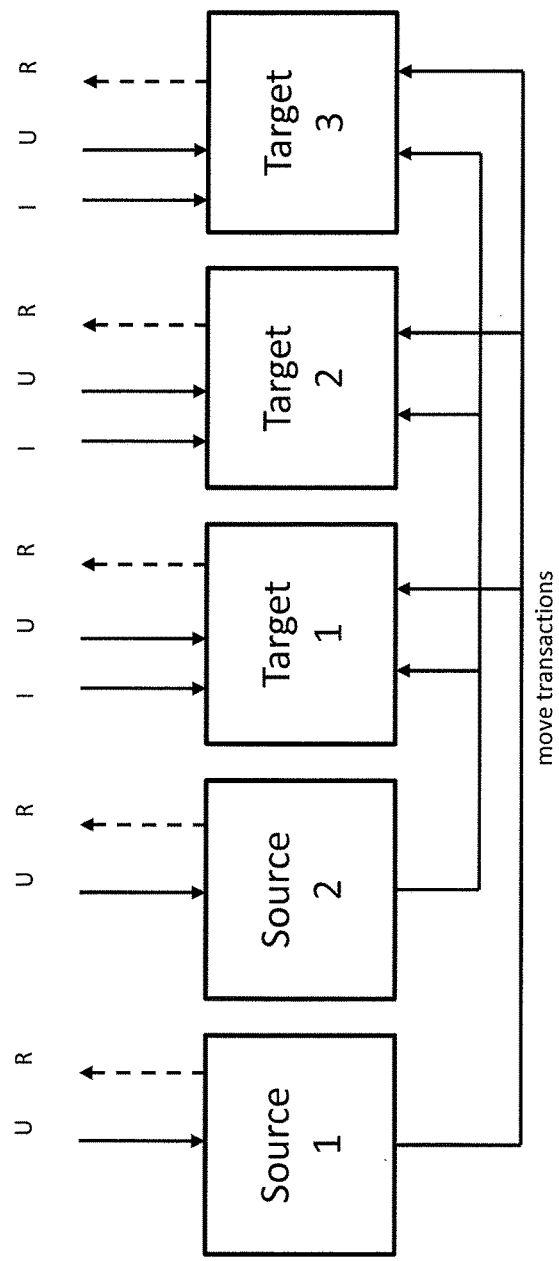
FIG. 4 is a logic diagram illustrating asynchronous database table partitioning.

FIG. 4 is a diagram 300 that illustrates how two partitions (Source 1, Source 2) can be re-partitioned into three partitions (Target 1, Target 2, Target 3). In diagram 400, I=an insert operation, U=an update/upsert/delete operation, R=a read operation. All five of the partitions (Source 1, Source 2, Target 1, Target 2, Target 3) all exist at the same time and can be considered during an update/upsert/delete operation U. However, only the new partitions (Target 1, Target 2, Target 3) handle insert operations I.

Stated differently, when the client deletes a row, the delete operation is executed on the source and on the target partitions. The row that shall be deleted is either in the source or in the target partitions. When the client updates a row, the update operation is executed on the source and on the target partitions. The row that shall be deleted is either in the source or in the target partitions. If it is in the source partition, it is deleted there and the updated row is inserted into the target partition. In addition, an upsert operation works similarly to that of an update operation.

In addition to data being moved at a row level, in some cases, data can be moved at the column level. Columns are stored in internal structures. With the current subject matter, it is possible to read from source columns and to write the data into target columns, considering the allocation derived from the partition specification. This way of moving data maintains a column-like source representation. But in cases in which a target column requires sources that are on remote servers, this operation becomes complex. This can be realized by using a remote reading agent and by each server collecting all data for the respective target servers and sending it followed by all target serves assembling target columns. It is noted that while the processing on the columns take place, new or updated rows are written into the delta index of the target partitions. The columns of the main index must not be touched and the move operation on the main index has to be completed before the delta index consumes too much memory.

One or more aspects or features of the subject matter described herein may be realized in digital electronic circuitry, integrated circuitry, specially designed ASICs (application specific integrated circuits), computer hardware, firmware, software, and/or combinations thereof. These various implementations may include implementation in one or more computer programs that are executable and/or interpretable on a programmable system including at least one programmable processor, which may be special or general purpose, coupled to receive data and instructions from, and to transmit data and instructions to, a storage system, at least one input device (e.g., mouse, touch screen, etc.), and at least one output device.

These computer programs, which can also be referred to as programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" (sometimes referred to as a computer program product) refers to physically embodied apparatus and/or device, such as for example magnetic discs, optical disks, memory, and Programmable Logic Devices (PLDs), used to provide machine instructions and/or data to a programmable data processor, including a machine-readable medium that receives machine instructions as a machine-readable signal. The term "machine-readable signal" refers to any signal used to provide machine instructions and/or data to a programmable data processor. The machine-readable medium can store such machine instructions non-transitorily, such as for example as would a non-transient solid state memory or a magnetic hard drive or any equivalent storage medium. The machine-readable medium can alternatively or additionally store such machine instructions in a transient manner, such as for example as would a processor cache or other random access memory associated with one or more physical processor cores.

The subject matter described herein may be implemented in a computing system that includes aback-end component (e.g., as a data server), or that includes a middleware component (e.g., an application server), or that includes a front-end component (e.g., a client computer having a graphical user interface or a Web browser through which a user may interact with an implementation of the subject matter described herein), or any combination of such backend, middleware, or front-end components. The components of the system may be interconnected by any form or medium of digital data communication (e.g., a communication network). Examples of communication networks include a local area network ("LAN"), a wide area network ("WAN"), and the Internet.

The computing system may include clients and servers. A client and server are generally remote from each other and typically interact through a communication network. The relationship of client and server arises by virtue of computer programs running on the respective computers and having a client-server relationship to each other.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flow(s) depicted in the accompanying figures and/or described herein do not necessarily require the particular order shown, or sequential order, to achieve desirable results. Other implementations may be within the scope of the following claims.

What is claimed is:

1. A computer-implemented method, comprising:
    initiating a repartitioning of a table of a database, the table being repartitioned from source partitions to target partitions;
    specifying a transition partition specification identifying the source partitions and the target partitions;
    receiving, from a client, an operation with respect to the table; and
    concurrently executing the operation and moving data from the source partitions to the target partitions, the moving of the data being based at least on the transition partition specification, the data being moved on a row level by at least starting a data move transaction as a part of a background job, selecting data from a source partition, inserting the selected data into a target partition using an insert stack forming part of the database, deleting the selected data from the source partition, and committing the data move transaction, the operation being executed concurrently with the moving of the data by at least:
    in response to the operation deleting at least one row of data from the table, executing the operation by at least deleting the at least one row of data from both the source partitions and the target partitions;
    in response to the operation updating the at least one row of data from the table, executing the operation by at least:
    deleting the at least one row of data from both the source partitions and the target partitions; and
    inserting at least one updated row of data into the target partitions but not the source partitions; and
    in response to the operation inserting the at least one row of data into the table, executing the operation by at least inserting the at least one row of data into the target partitions but not the source partitions;
    dropping the source partitions when all of the data has been moved to the target partitions and there are no open transactions accessing the source partitions; and
    exclusively locking the table and updating the transition partition specification to reflect the data as having been moved to the target partitions.

2. The method as in claim 1, wherein the data is moved on a column level.

3. The method as in claim 2, wherein the data is moved on the column level using a remote agent.

4. The method as in claim 1, wherein the database is an in-memory column-oriented database.

5. A non-transitory computer program product storing instructions which, when implemented by at least one data processor forming part of at least one computing system, result in operations comprising:
- initiating a repartitioning of a table of a database, the table being repartitioned from source partitions to target partitions;
- specifying a transition partition specification identifying the source partitions and the target partitions;
- receiving, from a client, an operation with respect to the table; and
- concurrently executing the operation and moving data from the source partitions to the target partitions, the moving of the data being based at least on the transition partition specification, the data being moved on a row level by at least starting a data move transaction as a part of a background job, selecting data from a source partition, inserting the selected data into a target partition using an insert stack forming part of the database, deleting the selected data from the source partition, and committing the data move transaction, the operation being executed concurrently with the moving of the data by at least:
- in response to the operation deleting at least one row of data from the table, executing the operation by at least deleting the at least one row of data from both the source partitions and the target partitions;
- in response to the operation updating the at least one row of data from the table, executing the operation by at least:
- deleting the at least one row of data from both the source partitions and the target partitions; and
- inserting at least one updated row of data into the target partitions but not the source partitions; and
- in response to the operation inserting the at least one row of data into the table, executing the operation by at least inserting the at least one row of data into the target partitions but not the source partitions;
- dropping the source partitions when all of the data has been moved to the target partitions and there are no open transactions accessing the source partitions; and
- exclusively locking the table and updating the transition partition specification to reflect the data as having been moved to the target partitions.

6. The computer program product as in claim 5, wherein the data is moved on a column level.

7. The computer program product as in claim 6, wherein the data is moved on the column level using a remote agent.

8. The computer program product as in claim 5, wherein the database is an in-memory column-oriented database.

9. A system comprising:
at least one data processor; and
memory storing instructions which, when implemented by the at least one data processor, result in operations comprising:
- initiating a repartitioning of a table of a database, the table being repartitioned from source partitions to target partitions;
- specifying a transition partition specification identifying the source partitions and the target partitions;
- receiving, from a client, an operation with respect to the table; and
- concurrently executing the operation and moving data from the source partitions to the target partitions, the moving of the data being based at least on the transition partition specification, the data being moved on a row level by at least starting a data move transaction as a part of a background job, selecting data from a source partition, inserting the selected data into a target partition using an insert stack forming part of the database, deleting the selected data from the source partition, and committing the data move transaction, the operation being executed concurrently with the moving of the data by at least:
- in response to the operation deleting at least one row of data from the table, executing the operation by at least deleting the at least one row of data from both the source partitions and the target partitions;
- in response to the operation updating the at least one row of data from the table, executing the operation by at least:
- deleting the at least one row of data from both the source partitions and the target partitions; and
- inserting at least one updated row of data into the target partitions but not the source partitions; and
- in response to the operation inserting the at least one row of data into the table, executing the operation by at least inserting the at least one row of data into the target partitions but not the source partitions;
- dropping the source partitions when all of the data has been moved to the target partitions and there are no open transactions accessing the source partitions; and
- exclusively locking the table and updating the transition partition specification to reflect the data as having been moved to the target partitions.

10. The system as in claim 9, wherein the data is moved on a column level using a remote agent.

11. The system as in claim 9, wherein the database is an in-memory column-oriented database.

* * * * *